(12) United States Patent
Guay et al.

(10) Patent No.: US 10,553,009 B2
(45) Date of Patent: Feb. 4, 2020

(54) AUTOMATICALLY GENERATING QUADRUPED LOCOMOTION CONTROLLERS

(71) Applicant: Disney Enterprises, Inc., Burbank, CA (US)

(72) Inventors: Martin Guay, Zurich (CH); Moritz Geilinger, Zurich (CH); Stelian Coros, Zurich (CH); Ye Yuan, Pittsburgh, PA (US); Robert W. Sumner, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 33 days.

(21) Appl. No.: 15/922,591

(22) Filed: Mar. 15, 2018

(65) Prior Publication Data

US 2019/0287288 A1 Sep. 19, 2019

(51) Int. Cl.
*G06T 13/40* (2011.01)
*G06T 19/00* (2011.01)
*G06T 3/40* (2006.01)
*G06T 19/20* (2011.01)

(52) U.S. Cl.
CPC ............... *G06T 13/40* (2013.01); *G06T 3/40* (2013.01); *G06T 19/003* (2013.01); *G06T 19/20* (2013.01)

(58) Field of Classification Search
None
See application file for complete search history.

(56) References Cited

U.S. PATENT DOCUMENTS

| 2004/0012594 A1* | 1/2004 | Gauthier | G06T 13/40 345/473 |
| 2008/0309664 A1* | 12/2008 | Zhou | G06T 13/40 345/420 |
| 2010/0073361 A1* | 3/2010 | Taylor | G06T 13/00 345/419 |

* cited by examiner

*Primary Examiner* — Jason A Pringle-Parker
(74) *Attorney, Agent, or Firm* — Patterson + Sheridan, LLP

(57) ABSTRACT

Techniques for generating locomotion data for animating a virtual quadruped model, starting at an origin point and travelling to a destination point along a defined path. A virtual skeletal structure for the virtual quadruped model is analyzed to identify a torso region, limbs each ending in a respective end effector, and limb attributes. A predefined locomotion template for virtual quadruped characters is retrieved and mapped to the virtual quadruped model by aligning the torso region and the plurality of limbs of the virtual skeletal structure for the virtual quadruped with a second torso region and a second plurality of limbs of the predefined locomotion template. Locomotion data is generated for the virtual quadruped model based on the defined path and by upscaling the mapped predefined locomotion template, based at least on the set of limb attributes determined by analyzing the virtual skeletal structure for the virtual quadruped model.

18 Claims, 10 Drawing Sheets

AUTOMATICALLY GENERATING QUADRUPED LOCOMOTION CONTROLLERS

BACKGROUND

Field of the Invention

Embodiments disclosed herein relate to computer-generated imagery (CGI) and computer-aided animation, and more specifically, this disclosure relates to techniques for realistically generating locomotion for quadruped models.

Description of the Related Art

With the increasingly wide-spread availability of computers, many graphic artists and animators rely upon computers to assist in the production process for the creation of animations, computer-generated imagery (CGI) and the like. In doing so, the artists and animators may create virtual models stored in computer memory that represent physical models or other entities (e.g., fictitious characters). Typically, two-dimensional (2D) or three-dimensional (3D) computer-aided animation combines 2D/3D models of objects and programmed movement of one or more of the models. In 3D computer animation, an object modeling process can be used in which objects are sculpted, akin to working with real clay or plaster, working from general forms to specific details, for example, with various sculpting tools. Models may be constructed, for example, out of geometrical vertices, faces, and edges in a 3D coordinate system to represent the objects. These virtual models can be manipulated using computers to, for example, simulate physics, design aesthetic actions such as poses or other deformations, create lighting, coloring and paint, or the like, of characters or other elements of a computer animation display.

SUMMARY

One embodiment described herein provides a method that includes receiving a request to generate locomotion data for a virtual quadruped model, starting at an origin point and travelling to a destination point along a defined path. The method further includes analyzing, by operation of one or more computer processors, a virtual skeletal structure for the virtual quadruped model to identify a torso region, a plurality of limbs each ending in a respective end effector, and a set of limb attributes. Additionally, the method includes retrieving a predefined locomotion template for virtual quadruped characters. The method further includes mapping the predefined locomotion template to the virtual quadruped model by aligning the torso region and the plurality of limbs of the virtual skeletal structure for the virtual quadruped with a second torso region and a second plurality of limbs of the predefined locomotion template. The method also includes generating locomotion data for the virtual quadruped model based on the defined path and by upscaling the mapped predefined locomotion template, based at least on the set of limb attributes determined by analyzing the virtual skeletal structure for the virtual quadruped model.

Another embodiment provides a system that includes one or more computer processors and a memory containing computer program code that, when executed by operation of the one or more computer processors, performs an operation that includes receiving a request to generate locomotion data for a virtual quadruped model, starting at an origin point and travelling to a destination point along a defined path. The operation further includes analyzing, by operation of one or more computer processors, a virtual skeletal structure for the virtual quadruped model to identify a torso region, a plurality of limbs each ending in a respective end effector, and a set of limb attributes. Additionally, the operation includes retrieving a predefined locomotion template for virtual quadruped characters. The operation further includes mapping the predefined locomotion template to the virtual quadruped model by aligning the torso region and the plurality of limbs of the virtual skeletal structure for the virtual quadruped with a second torso region and a second plurality of limbs of the predefined locomotion template. The operation also includes generating locomotion data for the virtual quadruped model based on the defined path and by upscaling the mapped predefined locomotion template, based at least on the set of limb attributes determined by analyzing the virtual skeletal structure for the virtual quadruped model.

Yet another embodiment provides a non-transitory computer-readable medium containing computer program code that, when executed by operation of one or more computer processors, performs an operation that includes receiving a request to generate locomotion data for a virtual quadruped model, starting at an origin point and travelling to a destination point along a defined path. The operation further includes analyzing, by operation of one or more computer processors, a virtual skeletal structure for the virtual quadruped model to identify a torso region, a plurality of limbs each ending in a respective end effector, and a set of limb attributes. Additionally, the operation includes retrieving a predefined locomotion template for virtual quadruped characters. The operation further includes mapping the predefined locomotion template to the virtual quadruped model by aligning the torso region and the plurality of limbs of the virtual skeletal structure for the virtual quadruped with a second torso region and a second plurality of limbs of the predefined locomotion template. The operation also includes generating locomotion data for the virtual quadruped model based on the defined path and by upscaling the mapped predefined locomotion template, based at least on the set of limb attributes determined by analyzing the virtual skeletal structure for the virtual quadruped model.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
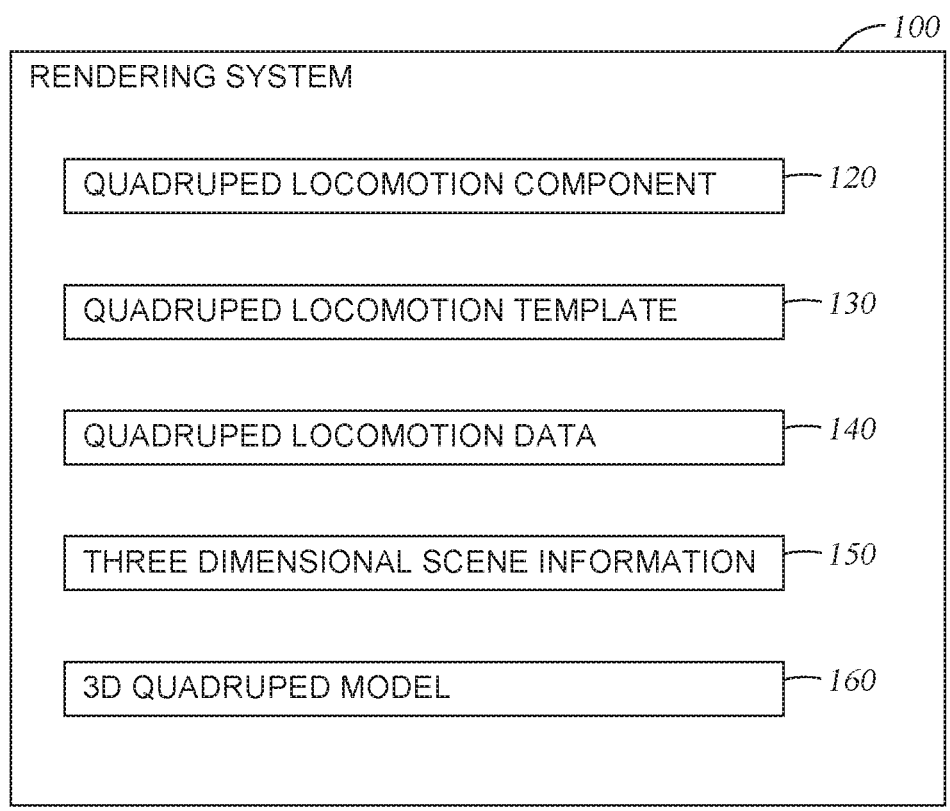
FIG. 1 is a block diagram illustrating a system configured with a conversational gesture component, according to one embodiment described herein.

Generally speaking, if the physical properties and external forces acting on a simulated object are accurately modeled, the resulting motion of the simulated object will be plausible and seemingly realistic. For instance, in rendering a virtual character wearing a jacket, the cloth of the jacket should hang down and fold naturally (i.e., as the physical cloth of a physical jacket would hang and fold). Furthermore, the cloth should react according to the motions and positions of the virtual character when the virtual character wears the jacket. Similarly, when animating virtual models of quadrupeds (i.e., four-legged animals), the quadrupeds should move in a realistic manner. Generally speaking, different types of quadrupeds move in dramatically different fashions. For example, a four-legged insectoid would move in a manner that is drastically different from a four-legged mammal such as a horse.

One challenge when animating quadrupeds is that motion capture systems for quadrupeds are all but nonexistent. For example, while many conventional solutions exist for capturing the motion of a human being (e.g., a motion capture suit can be worn by a user, a user can perform various movements in front of a green screen and the user's movements can be captured by one or more camera devices, and so on). However, such solutions are conventionally not available for quadrupeds, and to the extent they are available, such motion capture solutions may be difficult to implement, expensive and limited to only certain types of animals. For instance, while solutions may exist to capture the motion of real-world horses, no feasible solutions may exist for capturing the motion of a giraffe or hippo.

Numerous computing platforms and tools have been specially designed for computer-aided animation and CGI. One such example is now known as PhotoRealistic Render-Man, or PRMan for short. PRMan is a photorealistic RenderMan-compliant rendering software system based on the RenderMan Interface Specification (RISpec). One core functional aspect of PRMan can include the use of a "rendering engine" to convert geometric and mathematical descriptions of objects into images. This process is known in the industry as "rendering." For movies, other animated features, shorts, and special effects, a user (e.g., a skilled computer graphics artist) can specify the geometric or mathematical description of objects to be used in the rendered image or animation sequence, such as characters, props, background, or the like. The geometric description of the objects may include a number of animation control variables (avars) and values for the avars. In some instances, an animator may also pose the objects within the image or sequence and specify motions and positions of the objects over time to create an animation. In other instances, motions and positions of some objects, such as hair, clothing, and plants are usually too complex for a human animator to directly control at every stage of a computer animation. Instead, the human animator specifies the physics and/or physical properties of one or more dynamic or simulated objects. A computer program then employs physically-based numerical methods and techniques to simulate the motions and positions of these objects over time based on the physics or physical properties of the individual objects.

Generally, if the physical properties and external forces acting on a simulated object are accurately modeled, the resulting motion of the simulated object will be plausible and seemingly realistic. For instance, the mane of a lion should generally hang down and flow naturally. Furthermore, the lion's mane should react according to the motions and positions of the lion. However, modeling the simulated objects to be truly accurate is a delicate balance between the limitations and complexities of the animator's knowledge of physics and particle systems on the one hand and budgetary and time constraints on the other.

In addition to modeling simulated objects, the behaviors and mannerisms of the virtual characters must be modeled accurately in order to produce a realistic animation. While conventional solutions exist to capture the motion of humans (e.g., motion capture suits, capturing and analyzing images users perform the motion in front of a green screen, and so on) and such captured motions can then be applied to virtual human characters, such conventional solutions are ill-suited for capturing the motion of quadrupeds. For example, motion capture body suits may not be available for certain types of quadrupeds and to the extent they are available, the cost of obtaining such a specialized motion capture suit can make such a project infeasible as a practical matter. Moreover, when considering exotic animals such as giraffes, such conventional motion capture techniques are simply infeasible as a practical matter, as even if the specialized motion capture technology can be obtained, the cost of obtaining such specialized motion capture technology and the cost and impracticality of obtaining a giraffe to capture motion data from render such an exercise impractical.

Generally, the visual effects industry tends to make better and more successful movies through the use of previsualization. Generally, previsualization allows content creators to iterate over several scenes and concepts before they are shot in the real-world with high production costs. One key to the success of previsualization techniques is the possibility to rapidly conceive and experiment with different scenarios using virtual characters. Ideally, a movie director would direct such virtual characters as they were live actors. However, this is not always possible with current technology, particularly with respect to quadruped characters. For example, when a director wants a new quadruped character (e.g., a horse) to walk from a tree to a rock within a particular scene, the director's directive is sent to an animator who manually animates the quadruped character overnight. For scenes involving numerous different quadruped characters, such manual animation is costly and inefficient, and in some cases the sheer number of different quadruped characters within a scene can render manual animation techniques impractical.

As such, embodiments provide techniques for automatically generating quadruped character animations (e.g., walking, trotting, galloping, etc.), which can allow directors to quickly animate scenes featuring numerous different virtual quadruped characters. For example, embodiments could receive a request to generate locomotion data for a virtual quadruped model, starting at an origin point and travelling to a destination point along a defined path. Embodiments can analyze, by operation of one or more computer processors, a virtual skeletal structure for the virtual quadruped model to identify a torso region, a plurality of limbs each ending in a respective end effector, and a set of limb attributes. A predefined locomotion template for virtual quadruped characters can be retrieved and mapped to the virtual quadruped model by aligning the torso region and the plurality of limbs of the virtual skeletal structure for the virtual quadruped with a second torso region and a second plurality of limbs of the predefined locomotion template. Embodiments can generate locomotion data for the virtual quadruped model based on the defined path and by upscaling the mapped predefined locomotion template, based at least on the set of limb attributes determined by analyzing the virtual skeletal structure for the virtual quadruped model.

FIG. 1 is a block diagram illustrating a rendering system configured with a conversational gesture component, according to one embodiment described herein. As shown, the rendering system 100 includes a quadruped locomotion component 120, a quadruped locomotion template 130, quadruped locomotion data 140, three-dimensional scene information 150 and a three-dimensional (3D) quadruped model 160. The three-dimensional scene information 150 generally specifies various elements that make-up a three-dimensional scene. Such elements can include, without limitation, geometric primitives, geometric objects, lighting information, coloration information, shadow information, atmospheric information, texture information, optical effects (e.g., refraction of light information, motion-blue information, etc.), and so on. More generally, the three-dimensional scene information 150 can include any information that can be used in rendering a virtual scene, consistent with the functionality described herein.

Generally, the quadruped locomotion template 130 represents a template for animating a basic quadruped structure. For example, a separate quadruped locomotion template 130 could be provided for each of a plurality of different types of quadrupeds. For example, a first quadruped locomotion template 130 could be provided for insectoid-type quadrupeds, while a second quadruped locomotion template 130 could be provided for mammal-type quadrupeds. More, generally, any number of different quadruped locomotion templates 130 can be provided for any number of different quadruped types.

The 3D quadruped model 160 is a three-dimensional virtual representation of a quadruped. The 3D quadruped model 160 can include a skeletal structure defined by a plurality of bones, connected together using a plurality of different joints. Generally, a set of constraints can be defined for each of the plurality of joints, specifying information such as a range of motion of the respective joint. Additionally, the 3D quadruped model 160 can also include a surface mesh which defines the three-dimensional shape of the quadruped. Moreover, a texture can then be applied to the surface mesh to create a realistic depiction of the particular quadruped.

In one embodiment, the quadruped locomotion component 120 can automatically generate the quadruped locomotion data 140 for the 3D quadruped model 160. Doing so enables rapid animation of a number of different quadruped models, which can allow directors to quickly generate animated scenes including numerous different virtual quadruped characters. For example, the quadruped locomotion component 120 could receive a request to generate locomotion data for a virtual quadruped model, starting at an origin point and travelling to a destination point along a defined path. As an example, the quadruped locomotion component 120 could provide a graphical user interface and a user could utilize a user input device to drag a representation of the 3D quadruped model 160 into the graphical user interface, indicating that the quadruped locomotion data 140 should be generated for the 3D quadruped model 160. The quadruped locomotion component 120 could then analyze the virtual skeletal structure for the 3D quadruped model 160. For instance, the quadruped locomotion component 120 could identify a torso region within the skeletal structure, a plurality of limbs each ending in a respective end effector (e.g., the quadruped's feet), and a set of limb attributes. As an example, the quadruped locomotion component 120 could assume that the quadruped is depicted as standing on a ground surface and could identify the set of limbs that are touching the ground surface as the end effectors. The determined set of limb attributes could include, without limitation, (i) a limb type, of a plurality of distinct limb types, for each of the limbs, (ii) a set of joint attributes and constraints for a joint connecting two limbs of the plurality of limbs, and (iii) a measure of length of each of the limbs.

The quadruped locomotion template 130 for virtual quadruped characters can be retrieved and mapped to the 3D quadruped model 160 by aligning the torso region and the plurality of limbs of the virtual skeletal structure for the virtual quadruped with a second torso region and a second plurality of limbs of the predefined locomotion template. For example, the quadruped locomotion component 120 could be configured to recognize a number of alignment points, including shoulder joints, the torso region, and the set of limbs of the quadruped, and could align these various alignment points between the 3D quadruped model 160 and a default quadruped model used for the quadruped locomotion template 130.

The quadruped locomotion component 120 can generate the quadruped locomotion data 140 for the 3D quadruped model 160 based on the defined path and by upscaling the mapped predefined locomotion template, based at least on the set of limb attributes determined by analyzing the virtual skeletal structure for the virtual quadruped model. Thus, embodiments can provide a template quadruped character, onto which the user can drag and drop a new character to automatically generate motion clips. In the instance that the user wishes the quadruped to walk in a straight line from the origin point to the destination point, the user can specify the speed(s) at which the quadruped should travel and the quadruped locomotion component 120 can generate the quadruped locomotion data 140 accordingly. In many instance though, the user may wish to specify more nuanced controls for the quadruped, such as walking left, forward, right, as well as trot left, forward and right, and so on. In one embodiment, the quadruped locomotion component 120 provides a graphical user interface through which the user can define the quadruped's movements in a more granular fashion. As will be discussed in more detail below, these motion clips can be blended in real-time to conform to directional directives such as walk from A to B. For example, as the quadruped transitions from walking in a forward direction at a first frame to trotting in a left-ward direction at a second frame, the quadruped locomotion component 120 can blend the motion of the quadruped at the intervening frames, so that the quadruped smoothly transitions from a walk to a trot.

Figure 2:
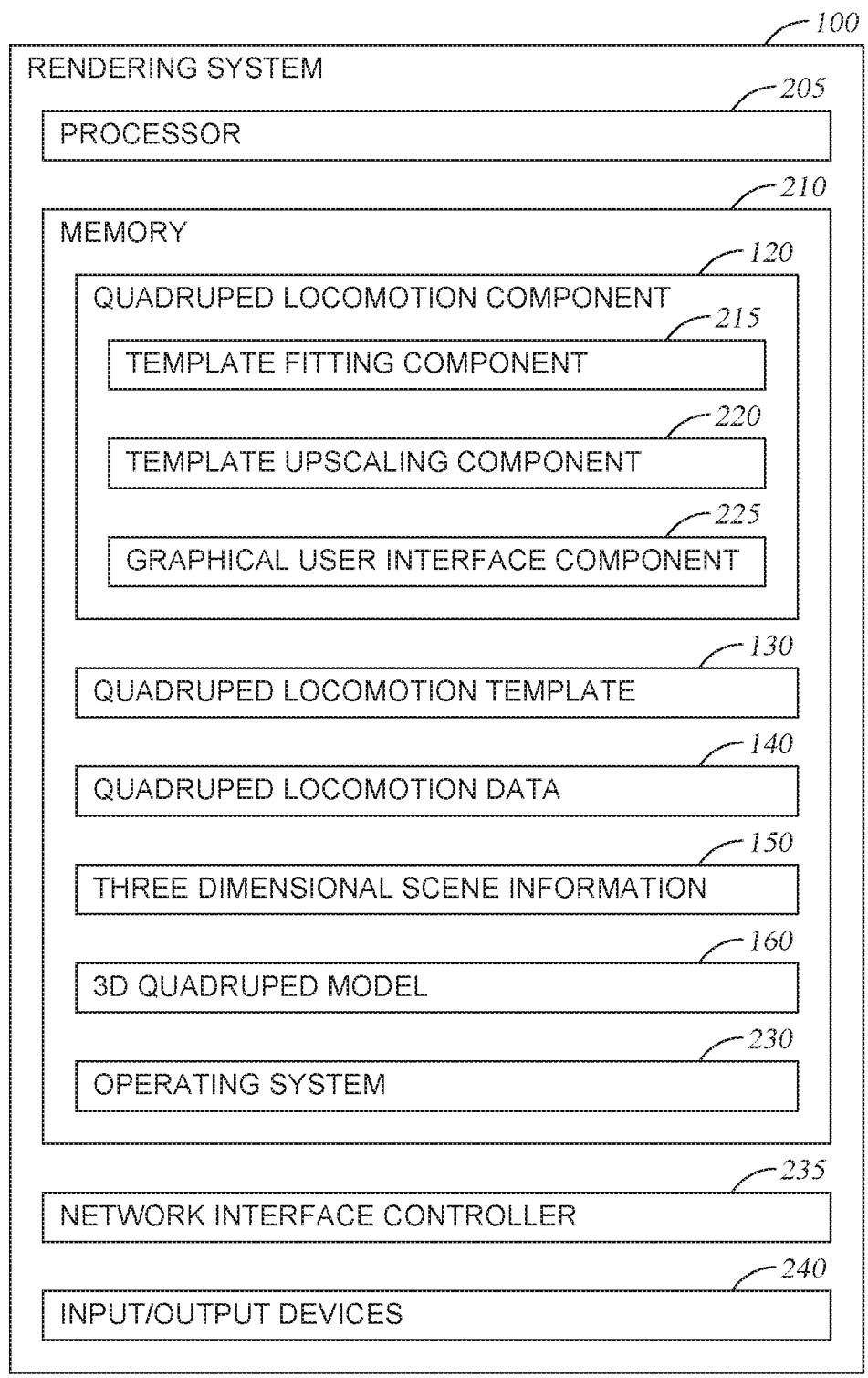
FIG. 2 is a block diagram illustrating a system configured with a conversational gesture component, according to one embodiment described herein.

FIG. 2 is a block diagram illustrating a system configured with a conversational gesture component 120, according to one embodiment described herein. As shown, the rendering system 100 includes, without limitation, a central processing unit (CPU) 205, a memory 210, and a network interface controller 235, and input/output (I/O) devices 240, each connected to a bus (not shown). The rendering system 100 may also include an I/O device interface (not shown) connecting I/O devices input/output devices 240. The I/O devices could include, without limitation, a keyboard, a mouse, and display devices connected to the rendering system 100. Further, in context of this disclosure, the computing elements shown in the rendering system 100 may correspond to a physical computing system (e.g., a system in a data center) or may be a virtual computing instance executing within a computing cloud.

The CPU 205 retrieves and executes programming instructions stored in the memory 210 as well as stores and retrieves application data residing in the memory 210. An interconnect (not shown) can be used to transmit programming instructions and application data between CPU 205, I/O devices interface, storage media (not shown), network interface controller 235, and memory 210. Note, CPU 205 is included to be representative of a single CPU, multiple CPUs, a single CPU having multiple processing cores, and the like. Memory 210 is generally included to be representative of a random access memory. Storage such as a disk drive storage device can also be connected to rendering system 100. Such storage may be a combination of fixed and/or removable storage devices, such as fixed disc drives, removable memory cards, or optical storage, network attached storage (NAS), or a storage area-network (SAN).

Illustratively, the memory 210 includes the quadruped locomotion component 120, quadruped locomotion template 130, quadruped locomotion data 140, three dimensional scene information 150, the 3D quadruped model 160 and an operating system 230. The quadruped locomotion component 120 generally includes a template fitting component 215, a template upscaling component 220 and a graphical user interface component 225. The graphical user interface component 225 could provide an interface through which a user could request (e.g., by dragging and dropping an indication of the 3D quadruped model 160 using an I/O device 240) to generate locomotion data for a virtual quadruped model, starting at an origin point and travelling to a destination point along a defined path. The graphical user interface component 225 can further provide controls through which the user can specify to turn the quadruped in different directions and can specify the type of movement (e.g., stationary, walk, trot, gallop, etc.) for the quadruped to perform at various points along the path from the origin to the destination.

The template fitting component 215 can analyze a virtual skeletal structure for the virtual quadruped model to identify a torso region, a plurality of limbs each ending in a respective end effector, and a set of limb attributes. For example, the template fitting component 215 could identify a ground surface within a virtual world containing the virtual quadruped model and could identify the end effectors of the plurality of limbs, based on a plurality of bones within the virtual skeletal structure determined to be in contact with the ground surface within the virtual world. The template fitting component 215 can then map the 3D quadruped model 160 onto a template 3D quadruped character corresponding to the quadruped locomotion template 130 at various alignment points. For example, the template fitting component 215 can map the template 3D quadruped character for the predefined locomotion template to the 3D quadruped model 160 by aligning the torso region and the plurality of limbs of the virtual skeletal structure for the 3D quadruped model 160 with a second torso region and a second plurality of limbs of the template quadruped character for the quadruped locomotion template 130.

In one embodiment, once the 3D quadruped model 160 is fit to the quadruped locomotion template 130, the template upscaling component 220 generates locomotion data for the quadruped model based on the defined path and by upscaling the mapped predefined locomotion template, based at least on the set of limb attributes determined by analyzing the virtual skeletal structure for the virtual quadruped model. For example, the template upscaling component 220 could determine a plurality of locomotion gait cycles for the virtual quadruped model travelling from the origin point to the destination point along the defined path. The template upscaling component 220 could then determine, for each of the plurality of locomotion gait cycles, a respective trajectory, based on the defined path. For example, the graphical user interface component 225 could provide a mechanism (e.g., a series of graphical buttons that the user can select) through which the quadruped's trajectory can be changed at various points along the path.

Additionally, the template upscaling component 220 could determine, for each of the plurality of locomotion gait cycles, a measure of movement on each of a plurality of different axes. For example, for a particular locomotion gait cycle, the template upscaling component 220 could determine a forward movement vector and a second vector that indicates the quadruped's trajectory in the left or right directions. The template upscaling component 220 could then retrieve respective locomotion data for each of the plurality of different axes. For example, the quadruped locomotion template 130 may specify motion data for a quadruped moving in the forward direction in a particular fashion (e.g., walk, trot, gallop, etc.) and can further specify motion data for the quadruped moving in the left and right directions again in various fashions. The template upscaling component 220 could blend the retrieved locomotion data for a first axis of the plurality of different axes together with retrieved locomotion data for a second axis of the plurality of different axes to produce the quadruped locomotion data 140 for the particular locomotion gait cycle. For example, if the quadruped is trotting predominantly in the forward direction but is turning slightly to the left, the template upscaling component 220 could blend the template locomotion data for trotting forwards with the template locomotion data for trotting to the left using weights that correspond to the ratio between the forward movement vector and the leftward movement vector, to generate the quadruped locomotion data 140 for the particular locomotion gait cycle. In doing so, because the quadruped is moving predominantly in the forward direction, the template upscaling component 220 can give a greater weight to the template locomotion data for trotting forwards.

Additionally, the quadruped locomotion template 130 could specify different locomotion gait patterns for different types of quadrupeds. For example, an insectoid-type quadruped could move with a different gait pattern than a mammal-type quadruped. The template upscaling component 220 can analyze the skeletal structure of the 3D quadruped model 160 and can determine a locomotion gait pattern to use for the virtual quadruped model and end effector height information for the locomotion gait pattern, based on the set of limb attributes determined by analyzing the virtual skeletal structure for the virtual quadruped model. For example, the template upscaling component 220 could analyze information within the set of limb attributes such as a measure of limb length for one of the plurality of limbs of the virtual quadruped model, in determining the type of gait pattern to use. Additionally, the template upscaling component 220 could look at joint placement within the identified limbs of the skeleton structure for the 3D quadruped model 160 to determine the type of gait pattern to use. For example, as many mammal-type quadrupeds have limbs with an elbow joint having a certain orientation, the template upscaling component 220 could be configured to recognize this limb configuration and use it to determine the type of quadruped the 3D quadruped model 160 depicts, and accordingly to determine the type of gait pattern to use for animating the quadruped.

Figure 3:
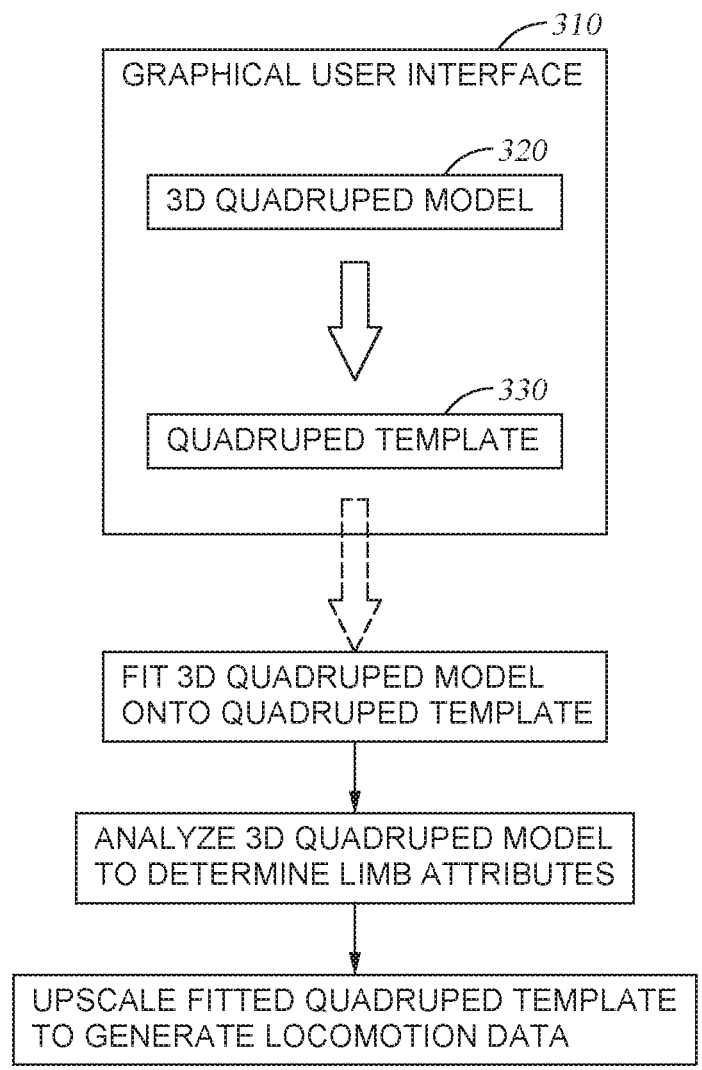
FIG. 3 is a workflow illustrating a method for generating locomotion data for animating a quadruped virtual character, according to one embodiment described herein.

FIG. 3 is a workflow illustrating a method for generating locomotion data for animating a quadruped virtual character, according to one embodiment described herein. As shown, the workflow 300 depicts a graphical user interface 310 that is provided by the graphical user interface component 225. In the depicted embodiment, an indication of a 3D quadruped model 320 is dragged onto a quadruped template 330 within the graphical user interface 310. For example, a user could utilize a user input device (e.g., a mouse) to drag an icon for a file containing the 3D quadruped model onto a depiction of the quadruped template 330.

The template fitting component 215 can then perform a fitting operation to fit the 3D quadruped model onto a template quadruped character. Additionally, the template upscaling component 220 can analyze the 3D quadruped model to determine limb attributes of the quadruped. As an example, the template upscaling component 220 could identify a torso region of the quadruped represented by the 3D quadruped model and could identify four end effectors of the quadruped, based on bones within the skeletal structure for the 3D quadruped model that are touching a ground surface. The template upscaling component 220 could then determine a respective set of bones within the skeletal structure for the 3D quadruped model that make up each of the four limbs of the quadruped. For example, the template upscaling component 220 could determine each limb include the set of bones that connect the limb's end effector with the torso region of the quadruped.

The template upscaling component 220 then upscales the fitted quadruped template to generate locomotion data. In doing so, the template upscaling component 220 can use mechanical simulation, together with characterizations of quadruped motion within the template, to generate locomotion for the quadruped. By doing so, embodiments can generate locomotion for quadrupeds of varying shapes and sizes. As such, embodiments described herein provide a parameterized motion generation system that utilizes constrained multi-objective optimization.

In upscaling the fitted quadruped template to generate the locomotion data, the template upscaling component 220 can consider various parameters in generating a motion plan for the quadruped. Such parameters can include, without limitation, a gait pattern for the quadruped (e.g., which foot falls at which time), foot height, center-of-mass velocity and rotational velocity during the gait. The template upscaling component 220 can perform an optimization to match these values together with various regularizers, thereby ensuring smooth transitions between clips. To support a wide range of characters, the quadruped locomotion template 130 can include a skeletal structure that is constrained to a known simplified template that has only hinge joints and predefined masses. By upscaling the motion from the simplified template to a higher-resolution template, the template upscaling component 220 can produce more realistic locomotion for quadrupeds of varying shapes and sizes, and can adapt the locomotion for quadrupeds with varying limb sizes and body proportions.

Figure 4:
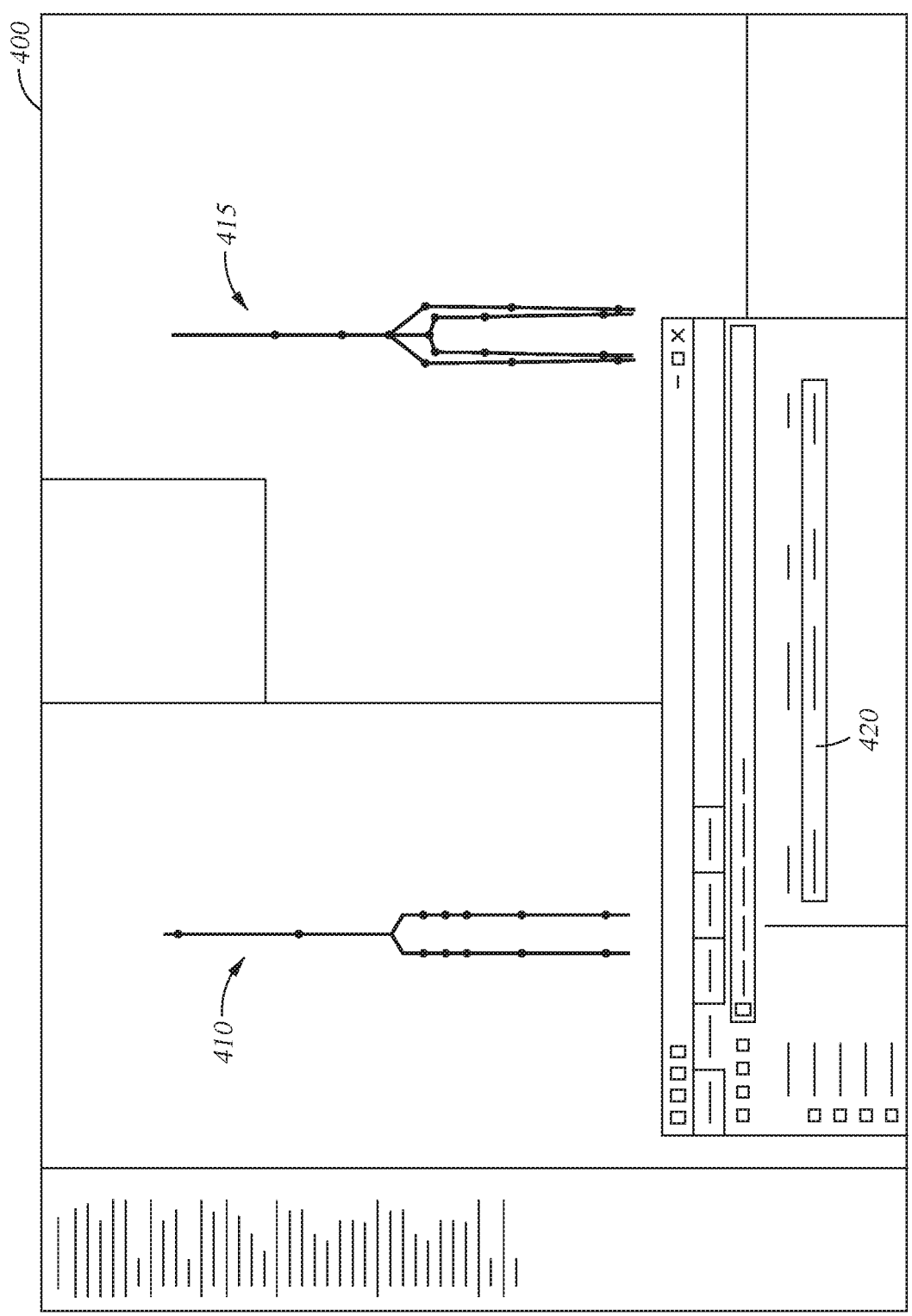
FIG. 4 is a screenshot illustrating a selection of a virtual quadruped model within a graphical user interface, according to one embodiment described herein.

FIG. 4 is a screenshot illustrating a selection of a virtual quadruped model within a graphical user interface, according to one embodiment described herein. As shown, the screenshot 400 illustrates a graphical user interface that includes a depiction of a quadruped template skeletal structure 410 and a file icon 420 corresponding to a file that contains a 3D quadruped model. Generally, a user can utilize an input device (e.g., a mouse, a touchscreen device, etc.) to drag the file icon 420 onto the depiction of the quadruped template skeletal structure 410, in order to begin the process of generating locomotion for the 3D quadruped model.

Figure 5:
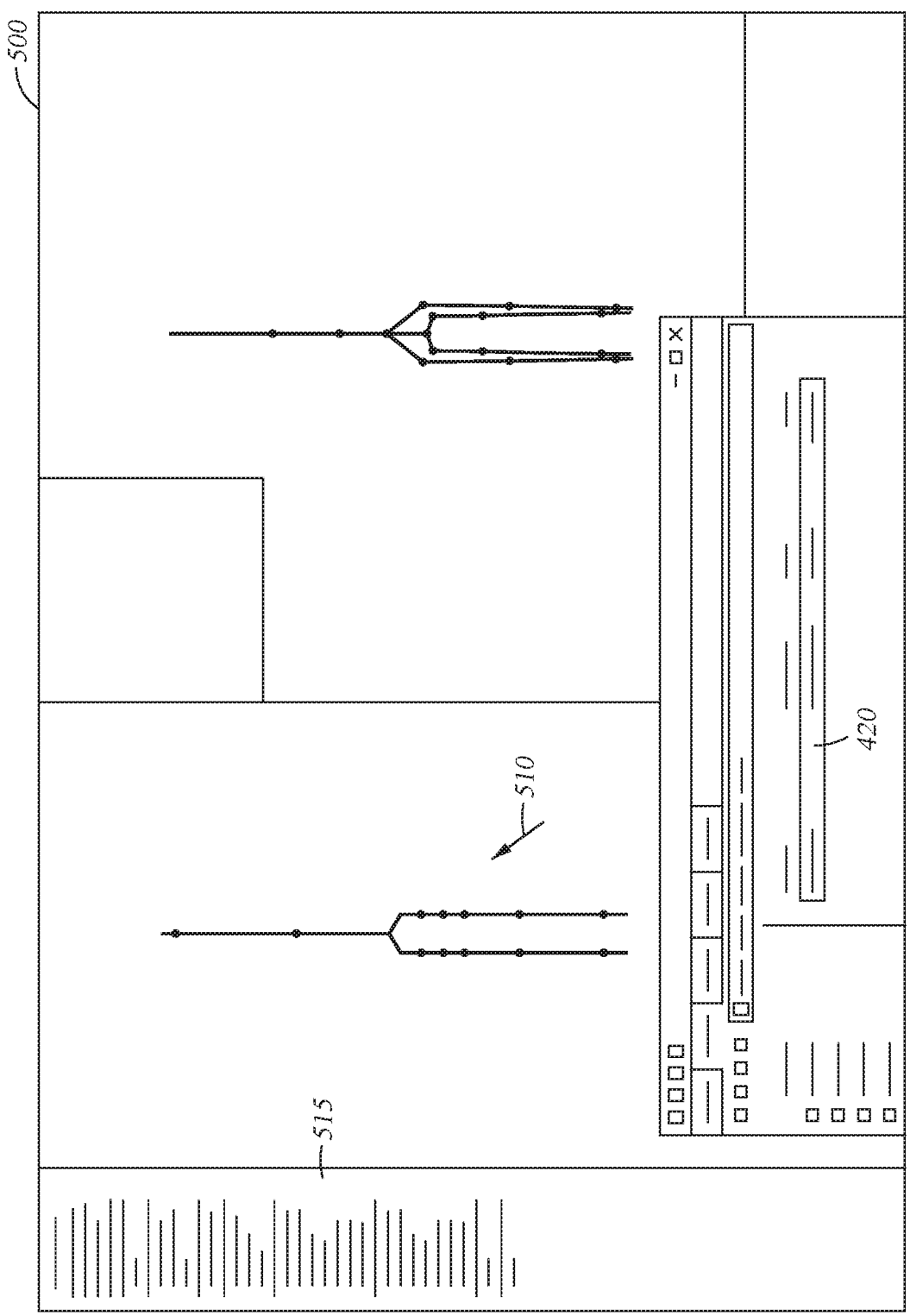
FIG. 5 is a screenshot illustrating dragging and dropping a selected virtual quadruped model onto a template structure within a graphical user interface, according to one embodiment described herein.

An example of this process is shown in FIG. 5, which illustrates a screenshot illustrating dragging and dropping a selected virtual quadruped model onto a template structure within a graphical user interface, according to one embodiment described herein. As shown, the screenshot 500 depicts a mouse cursor 510 positioned over the depiction of the quadruped template skeletal structure 410, as the user has dragged the file icon 420 for the file containing the 3D quadruped model and is dropping the file icon 420 onto the depiction of the quadruped template skeletal structure 410. Of note, while embodiments are described herein with reference to a drag-and-drop user interface, more generally any number of suitable user interfaces can be provided for selecting which 3D quadruped model should be animated. For example, another graphical user interface could specify a text field where the user can define a path on a filesystem for a file containing the 3D quadruped model. More generally, any suitable user interface can be used, consistent with the functionality described herein.

Once the user has selected which 3D quadruped model should be animated, the user can select the "Generate Motion!" button 515 to instruct the quadruped locomotion component 120 to generate motion data for the quadruped. As discussed above, once the user requests to generate the quadruped locomotion data 140 for the 3D quadruped model, the template fitting component 215 of the quadruped locomotion component 120 can analyze a virtual skeletal structure for the virtual quadruped model to identify a torso region, a plurality of limbs each ending in a respective end effector, and a set of limb attributes and can mapping the virtual quadruped model to a template quadruped character by aligning the torso region and the plurality of limbs of the virtual skeletal structure for the virtual quadruped with a second torso region and a second plurality of limbs of the template quadruped character. Upon selection of the button 515, the template upscaling component 220 can generate locomotion data for the virtual quadruped model based on the defined path and by upscaling the mapped predefined locomotion template, based at least on the set of limb attributes determined by analyzing the virtual skeletal structure for the virtual quadruped model.

Figure 6:
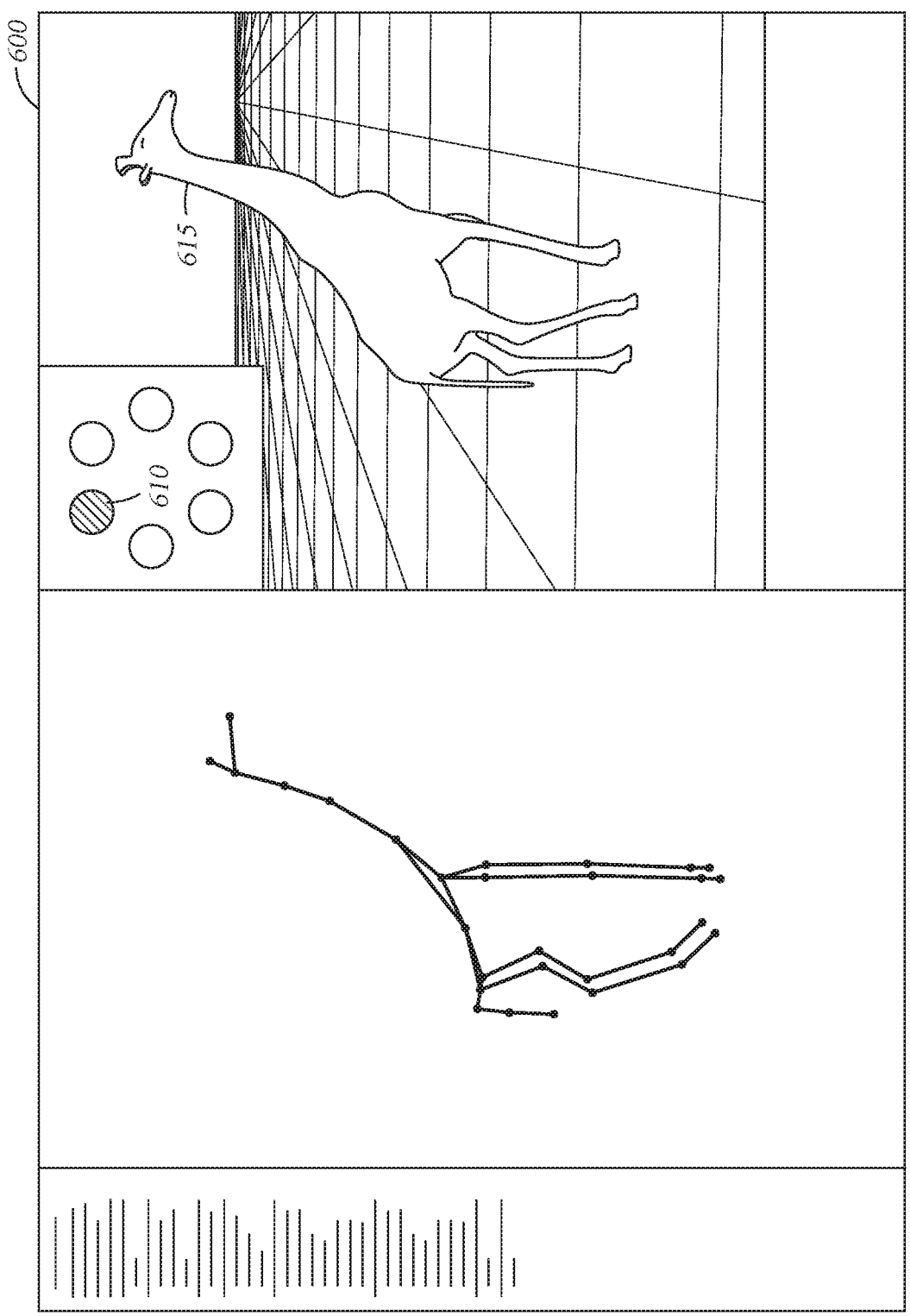
FIG. 6 is a screenshot illustrating a first animation of a virtual quadruped model according to a first locomotive control, according to one embodiment described herein.

In many instances, the user creating the animation may wish to have the animated quadruped travel along a particular path, rather than merely walking in a straight line. As such, the graphical user interface component 225 of the quadruped locomotion component 120 can provide a graphical user interface that includes locomotion controls for the animated quadruped. FIG. 6 is a screenshot illustrating a first animation of a virtual quadruped model according to a first locomotive control, according to one embodiment described herein. As shown, the screenshot 600 depicts a locomotion control 610 and an animated depiction of the quadruped model 615 performing the selected locomotion rendered in real-time. In the depicted example, the quadruped is moving in the selected direction (shown as a shaded circle within the locomotion control).

Figure 7:
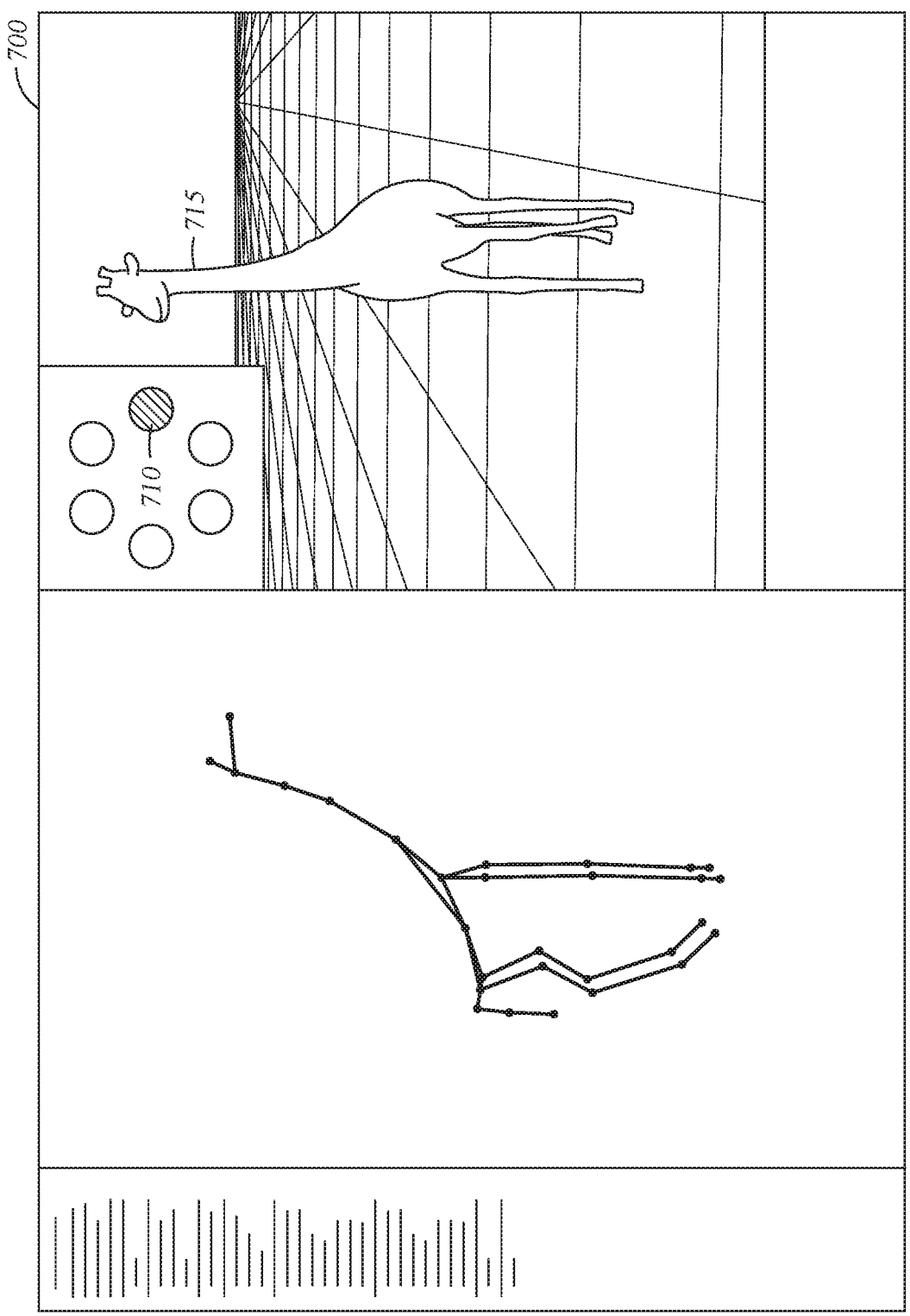
FIG. 7 is a screenshot illustrating a second animation of a virtual quadruped model according to a second locomotive control, according to one embodiment described herein.

When the user selects a different direction within the locomotion control, the quadruped locomotion component 120 can alter the locomotion of the quadruped, so that the quadruped faces in the different direction over a window of time. FIG. 7 is a screenshot illustrating a second animation of a virtual quadruped model according to a second locomotive control, according to one embodiment described herein. As shown, the screen 700 illustrates a different selected locomotion control direction 710, and the animated depiction of the quadruped model 715 shows that the locomotion of the quadruped has been altered according to the newly selected direction.

As discussed above, as the quadruped locomotion component 120 can blend template motion data of various forms in animating the quadruped. For example, as the quadruped transitions from a walking gait at a first frame to a trotting gait at a second frame, the quadruped locomotion component 120 can blend an upscaled template animation for the walking gait with an upscaled template animation for the trotting gait for each intervening frame. In doing so, the quadruped locomotion component 120 can weight the various upscaled template animations for each intervening frame, based on whether the intervening frame is closer to the first frame or the second frame (e.g., if the intervening frame is closer to the first frame, a higher weight can be assigned to the walking template animation, relative to the weight assigned to the trotting template animation). Likewise, as the quadruped transitions from walking in a straight line to walking diagonally either in the left or right direction, the quadruped locomotion component 120 can blend upscaled template animations for a quadruped walking in a straight direction with upscaled template animations for a quadruped walking in either the left or right direction (as appropriate). Moreover, the quadruped locomotion component 120 can weight the various upscale template animations based on the quadruped's trajectory at each frame.

Figure 8:
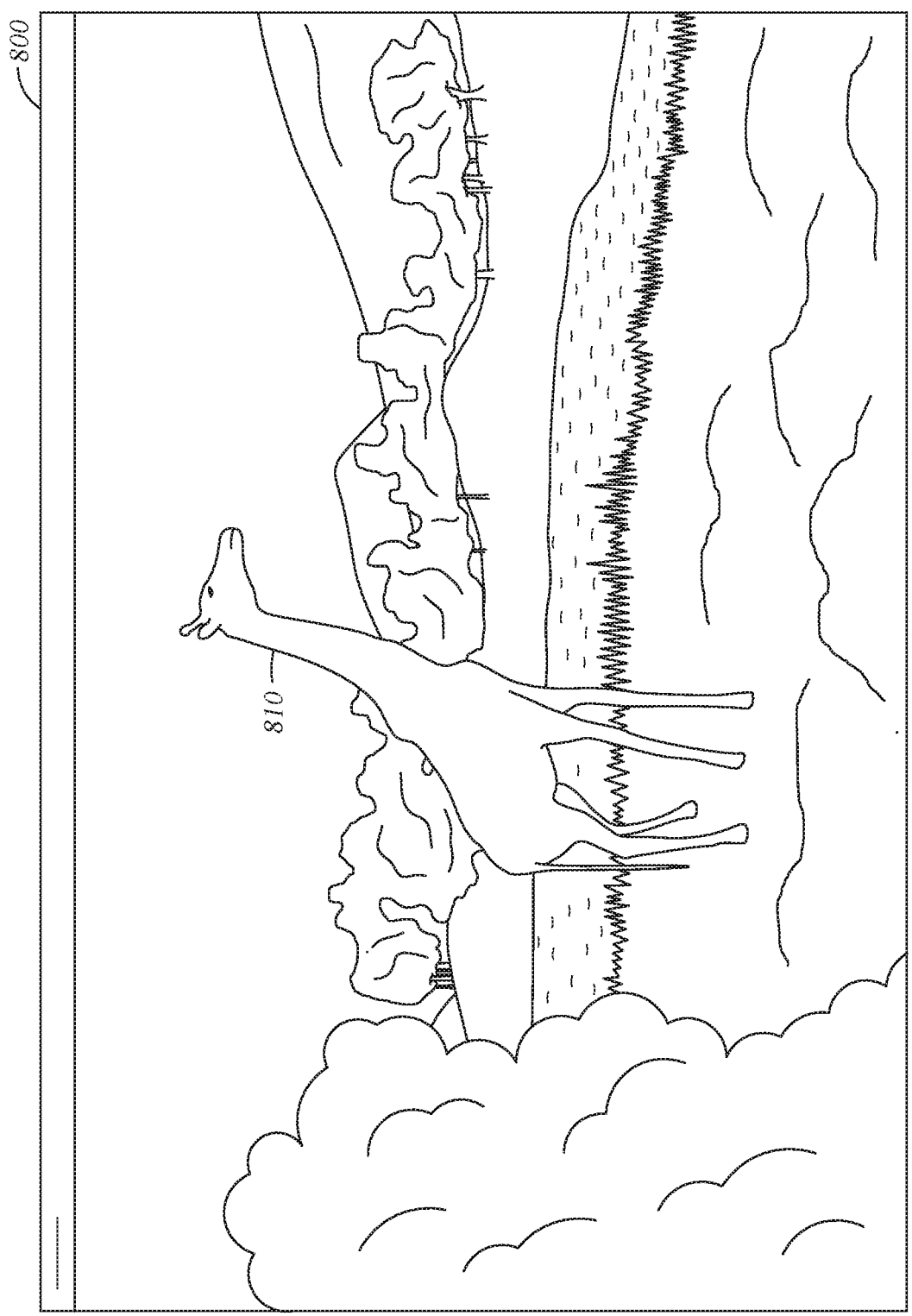
FIG. 8 illustrates a rendered scene with a virtual quadruped character animated according to a fitted, upscaled locomotion template, according to one embodiment described herein.

Once the user has finished creating the locomotion for the quadruped, the locomotion can be used to animate the quadruped model in a rendered scene. FIG. 8 illustrates a rendered scene with a virtual quadruped character animated according to a fitted, upscaled locomotion template, according to one embodiment described herein. As shown, the screenshot 800 illustrates a rendered form of the quadruped model 810 that is animated according to the generated locomotion data. Advantageously, embodiments described herein enable directors and content creators to quickly generate realistic animations for quadrupeds of various shapes and sizes.

Figure 9A:
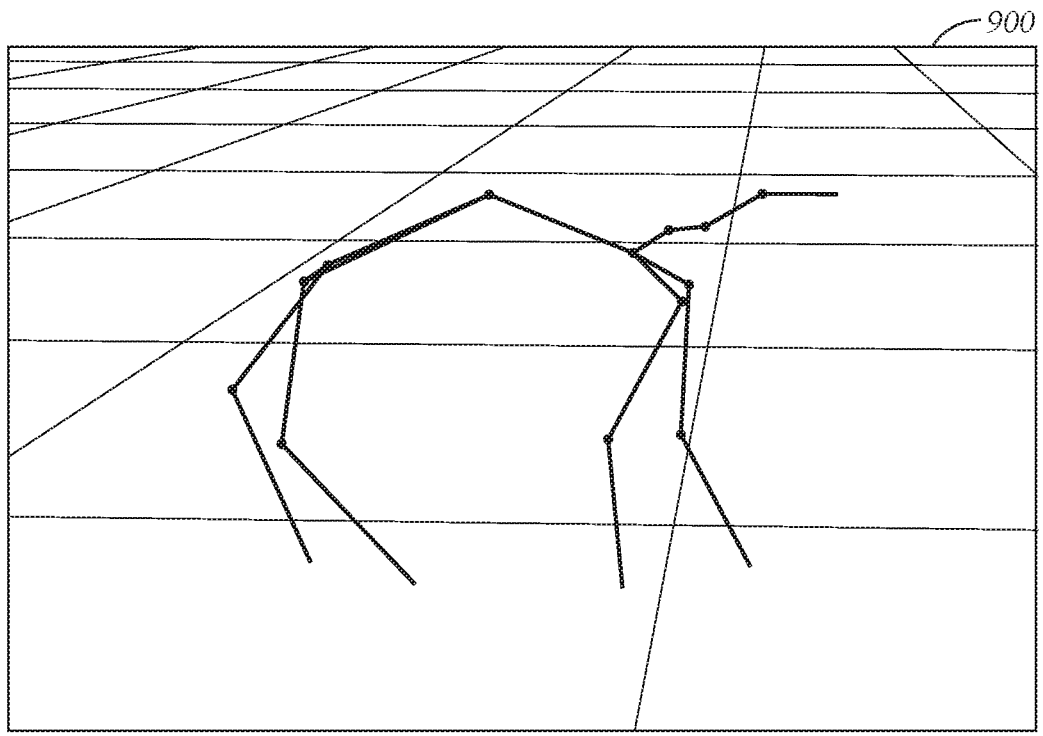
FIGS. 9A-B illustrate a base quadruped locomotion template and an upscaled locomotion template, according to embodiment described herein.
Figure 9B:
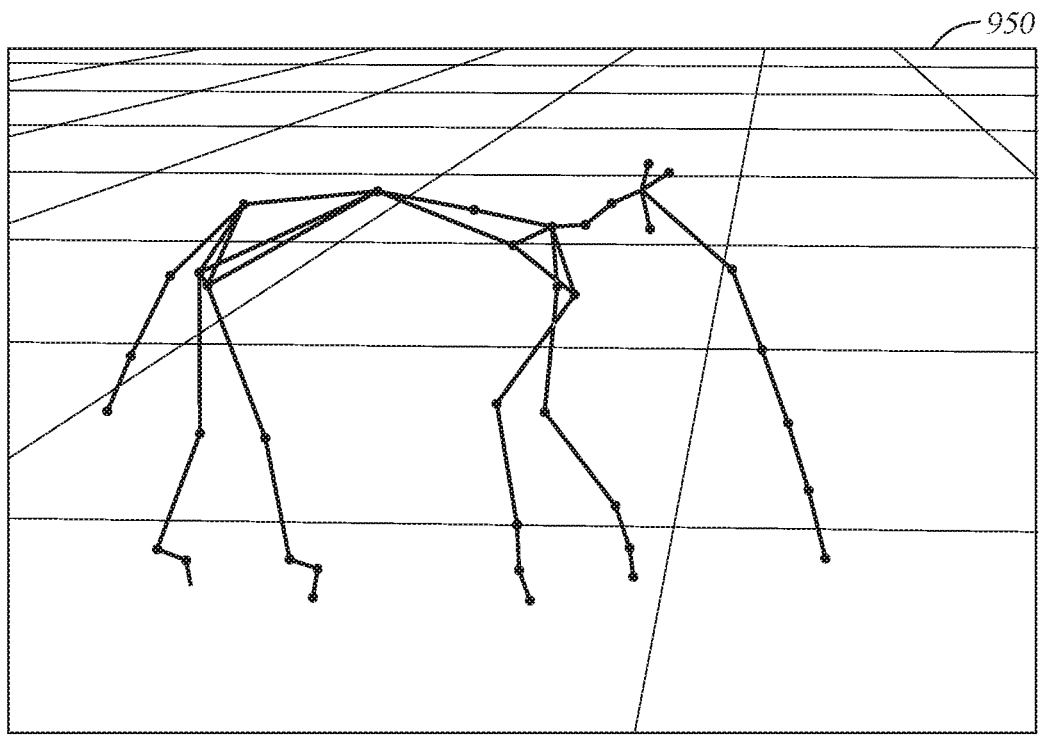

FIGS. 9A-B illustrate a base quadruped locomotion template and an upscaled locomotion template, according to embodiment described herein. As shown, FIG. 9A is a screenshot 900 illustrating a template quadruped skeleton. As discussed above, the quadruped locomotion component 120 can be configured to recognize different types of quadrupeds and can provide a different template quadruped skeleton for each type of quadruped. For example, while the screenshot 900 illustrates a skeletal structure for a mammal-type quadruped, the quadruped locomotion component 120 could provide other template quadruped skeletons for other types of quadrupeds (e.g., insectoid-type quadrupeds).

As discussed above, the template fitting component 215 can map a skeletal structure for a 3D quadruped model 160 onto the template quadruped skeleton. In doing so, the template fitting component 215 can determine a number of alignment points between the two skeletons and can align corresponding alignment points with one another (e.g., limbs can be aligned to limbs, shoulder joints can be aligned to shoulder joints, and so on). The template upscaling component 220 can then analyze the skeletal structure of the 3D quadruped model 160 and, based on the results of this analysis (e.g., limb length information for the 3D quadruped model's skeletal structure), the template fitting component 215 can upscale the fitted template quadruped skeleton. An example of this is shown in FIG. 9B, where the screenshot 950 illustrates an upscaled quadruped skeleton. As can be seen in the screenshot 950, the upscaled quadruped skeleton contains significantly more joints than the skeleton shown in the screenshot 900. Moreover, because the skeleton depicted in the screenshot 950 has been fit to the 3D quadruped model (in the present example, a model of a giraffe), the skeleton depicted in the screenshot 950 more closely resembles the quadruped being modeled. As a result, the locomotion generated by the quadruped locomotion component 120 for the skeleton depicted in the screenshot 950 will appear more realistic and will more accurately depict how the quadruped would move.

Figure 10:
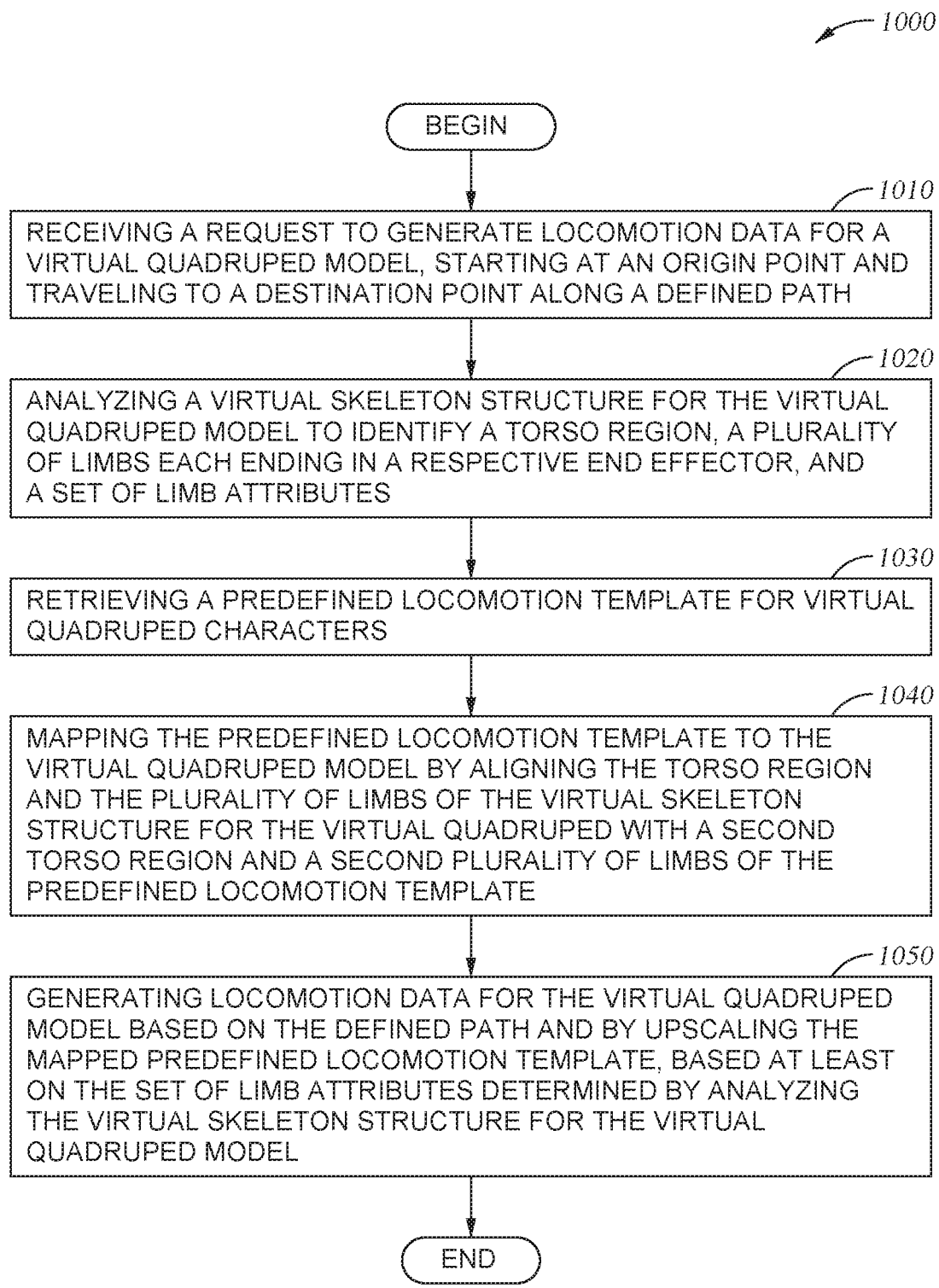
FIG. 10 is a flow diagram illustrating a method of generating locomotion data for a virtual quadruped model, according to one embodiment described herein.

FIG. 10 is a flow diagram illustrating a method of generating locomotion data for a virtual quadruped model, according to one embodiment described herein. As shown, the method 1000 begins at block 1010, where the graphical user interface component 225 of the quadruped locomotion component 120 receives a request to generate locomotion data for a 3D virtual quadruped model 160, the locomotion data describing locomotion for the 3D virtual quadruped model 160 that begins at an origin point and travelling to a destination point along a defined path. The quadruped locomotion component 120 analyzes a virtual skeletal structure for the virtual quadruped model 160 to identify a torso region, a plurality of limbs each ending in a respective end effector, and a set of limb attributes (block 1020). The quadruped locomotion component 120 retrieves a predefined locomotion template 130 for virtual quadruped characters (block 1030).

The template fitting component 215 then maps the predefined locomotion template to the virtual quadruped model by aligning the torso region and the plurality of limbs of the virtual skeletal structure for the virtual quadruped with a second torso region and a second plurality of limbs of the predefined locomotion template (block 1040). For example, the template fitting component 215 can align various joints (e.g., shoulder joints, elbow joints, etc.) within the quadruped locomotion template 130 with corresponding joints within the virtual skeletal structure for the virtual quadruped model 160. The template upscaling component 220 could then generate locomotion data for the virtual quadruped model based on the defined path and by upscaling the mapped predefined locomotion template, based at least on the set of limb attributes determined by analyzing the virtual skeletal structure for the virtual quadruped model (block 1050), and the method 1000 ends.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the described aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
    receiving a request to generate locomotion data for a virtual quadruped model, starting at an origin point and travelling to a destination point along a defined path;
    analyzing, by operation of one or more computer processors, a virtual skeletal structure for the virtual quadruped model comprising:
        identifying a torso region, a plurality of limbs, and a set of limb attributes;
        identifying a ground surface within a virtual world containing the virtual quadruped model; and
        identifying a respective end effector of each of the plurality of limbs, based on a plurality of bones within the virtual skeletal structure determined to be in contact with the ground surface within the virtual world;
    retrieving a predefined locomotion template for virtual quadruped characters;
    mapping the predefined locomotion template to the virtual quadruped model by aligning the torso region and the plurality of limbs of the virtual skeletal structure for the virtual quadruped model with a second torso region and a second plurality of limbs of the predefined locomotion template; and
    generating locomotion data for the virtual quadruped model based on the defined path and by upscaling the mapped predefined locomotion template, based at least on the set of limb attributes determined by analyzing the virtual skeletal structure for the virtual quadruped model.

2. The method of claim 1, wherein the set of limb attributes further comprise (i) a limb type, of a plurality of distinct limb types, for a first limb of the plurality of limbs, (ii) a set of joint attributes and constraints for a joint connecting two limbs of the plurality of limbs, and (iii) a measure of length of one of the plurality of limbs.

3. The method of claim 1, wherein generating locomotion data for the virtual quadruped model based on the defined path and by upscaling the mapped predefined locomotion template, based at least on the set of limb attributes determined by analyzing the virtual skeletal structure for the virtual quadruped model, further comprises:
    determining a plurality of locomotion gait cycles for the virtual quadruped model travelling from the origin point to the destination point along the defined path; and
    determining, for each of the plurality of locomotion gait cycles, a respective trajectory, based on the defined path.

4. The method of claim 3, wherein generating locomotion data for the virtual quadruped model based on the defined path and by upscaling the mapped predefined locomotion template, based at least on the set of limb attributes determined by analyzing the virtual skeletal structure for the virtual quadruped model, further comprises:
    determining, for each of the plurality of locomotion gait cycles, a measure of movement on each of a plurality of different axes.

5. The method of claim 4, wherein generating locomotion data for the virtual quadruped model based on the defined path and by upscaling the mapped predefined locomotion template, based at least on the set of limb attributes determined by analyzing the virtual skeletal structure for the virtual quadruped model, further comprises:
    retrieving respective locomotion data for each of the plurality of different axes; and
    blending the retrieved locomotion data for a first axis of the plurality of different axes together with retrieved locomotion data for a second axis of the plurality of different axes.

6. The method of claim 5, wherein blending the retrieved locomotion data for the first axis of the plurality of different axes together with retrieved locomotion data for the second axis of the plurality of different axes is further based on a magnitude of a trajectory on the first axis relative to a magnitude of a trajectory on the second axis.

7. The method of claim 6, wherein generating locomotion data for the virtual quadruped model based on the defined path and by upscaling the mapped predefined locomotion template, based at least on the set of limb attributes determined by analyzing the virtual skeletal structure for the virtual quadruped model, further comprises:
    determining, for a first locomotion gait cycle of the plurality of locomotion gait cycles, a first locomotion type occurring during a prior locomotion gait cycle relative to the first locomotion gait cycle, and a second locomotion type occurring during a subsequent locomotion gait cycle relative to the first locomotion gait cycle;
    retrieving a first locomotion data template corresponding to the first locomotion type and a second locomotion data template corresponding to the second locomotion type; and
    blending the first locomotion data template together with the second locomotion data template.

8. The method of claim 7, wherein the first locomotion type and the second locomotion type are distinct relative to one another, and wherein the first locomotion type and the second locomotion type are selected from a set of locomotion types including at least (i) a stationary motion type, (ii) a walking motion type, (iii) a gait motion type and (iv) a gallop motion type.

9. The method of claim 1, wherein receiving a request to generate locomotion data for a virtual quadruped model, starting at an origin point and travelling to a destination point along a defined path, further comprises:
    providing a graphical user interface through which an indication of the virtual quadruped model can be dragged, using an input device, from the origin point and dropped on the destination point to create the defined path.

10. The method of claim 9, wherein the graphical user interface further provides a mechanism through which a rate of travel for the virtual quadruped model along the defined path can be specified.

11. The method of claim 1, wherein generating locomotion data for the virtual quadruped model based on the defined path and by upscaling the mapped predefined locomotion template, based at least on the set of limb attributes determined by analyzing the virtual skeletal structure for the virtual quadruped model further comprises:
    determining a locomotion gait pattern for the virtual quadruped model and end effector height information for the locomotion gait pattern, based on the set of limb attributes determined by analyzing the virtual skeletal structure for the virtual quadruped model, wherein the set of limb attributes further includes at least a measure of limb length for one of the plurality of limbs of the virtual quadruped model.

12. A system, comprising:
one or more computer processors; and
a memory containing computer program code that, when executed by operation of the one or more computer processors, performs an operation comprising:
receiving a request to generate locomotion data for a virtual quadruped model, starting at an origin point and travelling to a destination point along a defined path;
analyzing, by operation of one or more computer processors, a virtual skeletal structure for the virtual quadruped model comprising:
identifying a torso region, a plurality of limbs, and a set of limb attributes;
identifying a ground surface within a virtual world containing the virtual quadruped model; and
identifying a respective end effector of each of the plurality of limbs, based on a plurality of bones within the virtual skeletal structure determined to be in contact with the ground surface within the virtual world;
retrieving a predefined locomotion template for virtual quadruped characters;
mapping the predefined locomotion template to the virtual quadruped model by aligning the torso region and the plurality of limbs of the virtual skeletal structure for the virtual quadruped model with a second torso region and a second plurality of limbs of the predefined locomotion template; and
generating locomotion data for the virtual quadruped model based on the defined path and by upscaling the mapped predefined locomotion template, based at least on the set of limb attributes determined by analyzing the virtual skeletal structure for the virtual quadruped model.

13. The system of claim 12, wherein the set of limb attributes further comprise (i) a limb type, of a plurality of distinct limb types, for a first limb of the plurality of limbs, (ii) a set of joint attributes and constraints for a joint connecting two limbs of the plurality of limbs, and (iii) a measure of length of one of the plurality of limbs.

14. The system of claim 12, wherein generating locomotion data for the virtual quadruped model based on the defined path and by upscaling the mapped predefined locomotion template, based at least on the set of limb attributes determined by analyzing the virtual skeletal structure for the virtual quadruped model, further comprises:
determining a plurality of locomotion gait cycles for the virtual quadruped model travelling from the origin point to the destination point along the defined path; and
determining, for each of the plurality of locomotion gait cycles, a respective trajectory, based on the defined path.

15. The system of claim 14, wherein generating locomotion data for the virtual quadruped model based on the defined path and by upscaling the mapped predefined locomotion template, based at least on the set of limb attributes determined by analyzing the virtual skeletal structure for the virtual quadruped model, further comprises:
determining, for each of the plurality of locomotion gait cycles, a measure of movement on each of a plurality of different axes;
retrieving respective locomotion data for each of the plurality of different axes; and
blending the retrieved locomotion data for a first axis of the plurality of different axes together with retrieved locomotion data for a second axis of the plurality of different axes, wherein blending the retrieved locomotion data for the first axis of the plurality of different axes together with retrieved locomotion data for the second axis of the plurality of different axes is further based on a magnitude of a trajectory on the first axis relative to a magnitude of a trajectory on the second axis.

16. The system of claim 15, wherein generating locomotion data for the virtual quadruped model based on the defined path and by upscaling the mapped predefined locomotion template, based at least on the set of limb attributes determined by analyzing the virtual skeletal structure for the virtual quadruped model, further comprises:
determining, for a first locomotion gait cycle of the plurality of locomotion gait cycles, a first locomotion type occurring during a prior locomotion gait cycle relative to the first locomotion gait cycle, and a second locomotion type occurring during a subsequent locomotion gait cycle relative to the first locomotion gait cycle;
retrieving a first locomotion data template corresponding to the first locomotion type and a second locomotion data template corresponding to the second locomotion type; and
blending the first locomotion data template together with the second locomotion data template,
wherein the first locomotion type and the second locomotion type are distinct relative to one another, and wherein the first locomotion type and the second locomotion type are selected from a set of locomotion types including at least (i) a stationary motion type, (ii) a walking motion type, (iii) a gait motion type and (iv) a gallop motion type.

17. The method of claim 1, wherein receiving a request to generate locomotion data for a virtual quadruped model, starting at an origin point and travelling to a destination point along a defined path, further comprises:
providing a graphical user interface through which an indication of the virtual quadruped model can be dragged, using an input device, from the origin point and dropped on the destination point to create the defined path, wherein the graphical user interface further provides a mechanism through which a rate of travel for the virtual quadruped model along the defined path can be specified, and
wherein generating locomotion data for the virtual quadruped model based on the defined path and by upscaling the mapped predefined locomotion template, based at least on the set of limb attributes determined by analyzing the virtual skeletal structure for the virtual quadruped model further comprises determining a locomotion gait pattern for the virtual quadruped model and end effector height information for the locomotion gait pattern, based on the set of limb attributes determined by analyzing the virtual skeletal structure for the virtual quadruped model, wherein the set of limb attributes further includes at least a measure of limb length for one of the plurality of limbs of the virtual quadruped model.

18. A non-transitory computer-readable medium containing computer program code that, when executed by operation of one or more computer processors, performs an operation comprising:
receiving a request to generate locomotion data for a virtual quadruped model, starting at an origin point and travelling to a destination point along a defined path;

analyzing, by operation of one or more computer processors, a virtual skeletal structure for the virtual quadruped model comprising:
- identifying a torso region, a plurality of limbs, and a set of limb attributes;
- identifying a ground surface within a virtual world containing the virtual quadruped model; and
- identifying a respective end effector of each of the plurality of limbs, based on a plurality of bones within the virtual skeletal structure determined to be in contact with the ground surface within the virtual world;

retrieving a predefined locomotion template for virtual quadruped characters;

mapping the predefined locomotion template to the virtual quadruped model by aligning the torso region and the plurality of limbs of the virtual skeletal structure for the virtual quadruped model with a second torso region and a second plurality of limbs of the predefined locomotion template; and generating locomotion data for the virtual quadruped model based on the defined path and by upscaling the mapped predefined locomotion template, based at least on the set of limb attributes determined by analyzing the virtual skeletal structure for the virtual quadruped model.

\* \* \* \* \*